United States Patent [19]

Papst

[11] 4,400,140
[45] Aug. 23, 1983

[54] COMPACT FAN

[75] Inventor: Georg F. Papst, St. Georgen, Fed. Rep. of Germany

[73] Assignee: Papst Motoren KG, St. Georgen, Fed. Rep. of Germany

[21] Appl. No.: 227,415

[22] Filed: Jan. 22, 1981

Related U.S. Application Data

[63] Continuation of Ser. No. 932,298, Aug. 9, 1978, abandoned.

[30] Foreign Application Priority Data

Aug. 11, 1977 [CH] Switzerland .......................... 9838/77

[51] Int. Cl.³ ........................ F04B 35/04; H02K 11/00
[52] U.S. Cl. ........................................ 417/354; 310/72
[58] Field of Search .................... 417/354, 353; 310/72

[56] References Cited

U.S. PATENT DOCUMENTS

| | | | |
|---|---|---|---|
| 1,545,422 | 7/1925 | Graichen | 310/72 UX |
| 1,894,724 | 1/1933 | Apple | 310/72 |
| 2,032,129 | 2/1936 | Jackson et al. | 310/72 |
| 3,011,083 | 11/1961 | Jacob | 310/72 |
| 3,362,627 | 1/1968 | Papst | 417/354 |
| 3,700,358 | 10/1972 | Papst et al. | 417/354 |

Primary Examiner—Richard E. Gluck
Attorney, Agent, or Firm—Michael J. Striker

[57] ABSTRACT

The fan comprises a fan housing surrounding a fan wheel which is coaxial with the fan's drive motor. The drive motor is a permanent-capacitor induction motor with squirrel-cage rotor, the stator of which includes a main winding and an auxiliary winding, the former energized directly from a one-phase A.C. power source, the latter energized through the intermediary of a capacitor, the capacitor serving to produce a second or auxiliary phase of energization for the sake of a rotating stator field. In order that the capacitor not consume valuable space within the fan, especially in the case of a small fan, the capacitor is a wound capacitor of generally annular overall configuration, mounted coaxial with the drive motor radially outward of the drive motor.

12 Claims, 7 Drawing Figures

COMPACT FAN

This is a continuation, of application Ser. No. 932,298, filed Aug. 9, 1978, now abandoned.

BACKGROUND OF THE INVENTION

The present invention concerns compact fans comprising a drive motor, a fan wheel coaxial with the drive motor, and a housing surrounding the fan wheel.

For reasons of economy, fans and blowers of this type are typically provided with drive motors of the simplest possible construction having a concentric stator winding, with sizable copper rings usually being provided on the pole legs of the stator core to serve as shading rings. When powering fans and blowers, the most common of such motors are single-phase induction motors operating asynchronously—i.e., with slip—and having a short-circuited squirrel-cage rotor winding.

Shaded-pole motors of the type normally used to power small fans and blowers are very economical to produce, but have electrical and ecological disadvantages. They exhibit a fairly low efficiency—i.e., consume power somewhat wastefully—and furthermore produce a considerable amount of noise during operation due to the magnetic asymmetry of the motor design.

SUMMARY OF THE INVENTION

It is the general object of the invention to provide a fan or blower representing an optimum compromise with respect to efficiency, economy of manufacture and structural compactness.

This is achieved in accordance with the invention by providing a fan or blower of the type in question with a drive motor provided with a capacitor for the establishment of an auxiliary phase of stator-field generation, e.g., a permanent-capacitor motor having a main winding connected directly to a one-phase A.C. power supply, an auxiliary winding connected in series with a capacitor which provides the additional or auxiliary phase of energization, and a squirrel-cage rotor. In accordance with the invention, the capacitor is of the wound type, e.g., the impregnated-paper type, and is wound into a fairly large annular or ring-shaped configuration which is mounted coaxial with the rotor rotation axis of the fan's drive motor, radially outwardly of the drive motor.

In one preferred embodiment of the invention, the wound capacitor is wound to form a ring-shaped structure whose internal diameter is greater than the diameter of the fan's fan wheel. Generally such capacitor is mounted on a part of the fan housing surrounding the fan wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
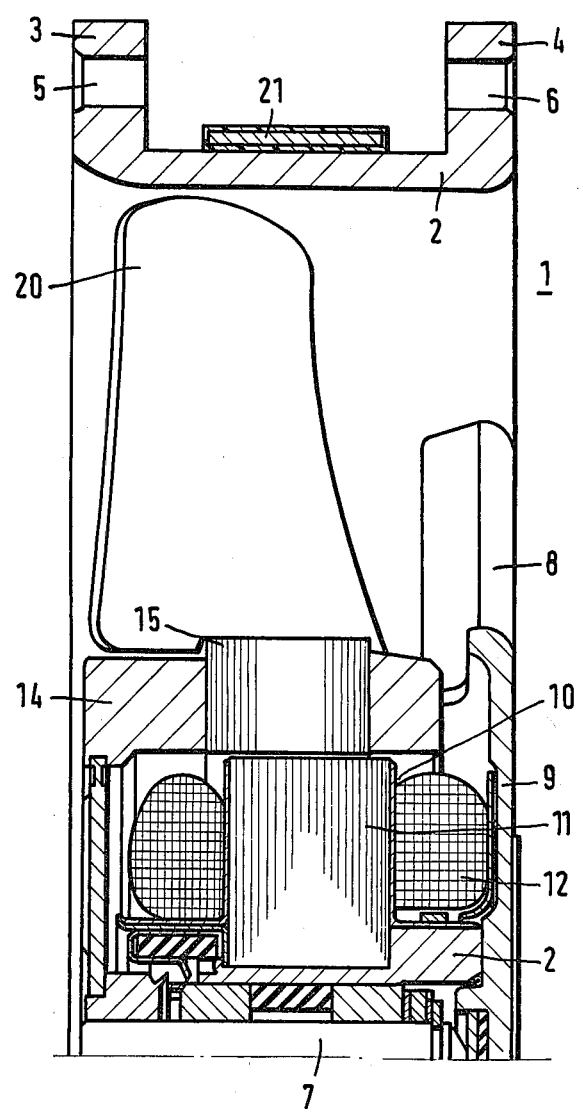
FIG. 1 is an axial section taken through the upper half of an exemplary axial-flow blower driven by an external-rotor drive motor and provided with a wound capacitor on the exterior of the fan housing, the section furthermore being taken through the mounting elements on the fan housing.

In the Figures, corresponding components are denoted by corresponding reference numerals, with the addition of primes and letters.

In FIG. 1, numeral 1 denotes in toto the housing of an axial-flow fan or blower. The housing 1 mainly comprises a cylindrical housing part 2. At each of its two axial ends, the housing part 2 is provided with radially outwards extending projections 3 at the left axial end, 4 at the right. These projections 3, 4 are provided with respective bores 5, 6 which accommodate mounting bolts, or the like. When viewing the fan axially, i.e., at right angles to the viewing direction in FIG. 1, the projections 3 or 4 are equiangularly spaced, e.g., four projections at each axial end of the fan spaced apart by 90°.

At the center of the cylindrical housing part 2, there is provided a rotor shaft 7, journalled by conventional means in a flange 9 which also limits the axial movement if any of shaft 7. The flange 9 is carried by the usual radially extending spokes 8 provided on the fan housing 1. Secured to flange 9 is the motor's stator 10, which is mainly comprised of a stack of stator plates 11 and a stator winding 12.

The rotor 14 of the external-rotor motor is of squirrel-cage design and comprises a stack 15 of rotor plates. In conventional manner, the rotor 14 is mounted for rotation about the stator 10. In the exemplary embodiment here depicted, the blades 20 of the fan are welded directly onto the stack of rotor plates 15 of the external rotor.

Figure 6:
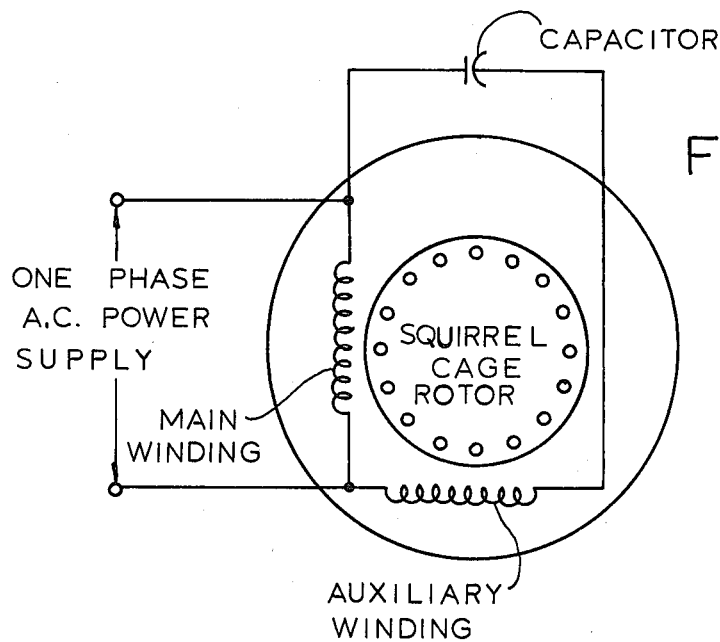
FIG. 6 is the circuit diagram of a permanent-capacitor induction motor.

In this embodiment the fan's drive motor is a permanent-capacitor induction motor having a main winding directly connected to a one-phase A.C. power source, an auxiliary winding connected in series with a capacitor for generation of the requisite rotating stator field, and a squirrel-cage rotor. The circuit diagram of conventional permanent-capacitor induction motors is depicted in FIG. 6.

This capacitor 21 is of the wound type, e.g., of the wound impregnated-paper type, and is wound to form a fairly large generally cylindrical or annular structure 21. In FIG. 1, the annular wound capacitor 21 is provided on the external periphery of the cylindrical part 2 of the fan housing 1, axially intermediate the radially outwards extending mounting projections 3 and 4. Because of the presence of the mounting projections 3, 4 at both axial ends of the fan housing 1, it is preferred that the angular wound capacitor 21 be wound in situ, i.e., that it be produced by winding its constituent strip(s) of paper and/or metal in place about the outer periphery of cylindrical housing part 2 intermediate the projections 3 and 4.

The wound capacitor 21 can be constituted by two metal strips provided with multiple intermediate paper strips, or preferably is constituted by metallic electrode strips each of which is coated on one face with plastic-impregnated paper, or the like.

Depending upon how the fan is to be installed, the fan housing 1 may in somne instances be provided with radially outwards extending mounting projections only at one of the two axial ends of the fan housing 1, i.e., only the mounting projections 3 or only the mounting projections 4. Alternatively, the fan housing 1 may be provided with such projections 3 and 4 at both its axial ends as shown in FIG. 1 but be of subdivided construction, i.e., consist of two halves joined at an annular seam axially intermediate the two axial ends of the fan. In these cases, it it not necessary to form the wound capacitor 21 by winding in situ. Instead, the capacitor 21 can be prewound, and be designed as a fairly sturdy structural component, e.g., a relatively rigid component, which can after its production be merely pushed into place around the periphery of the cylindrical housing part 2.

To protect the capacitor 21 against mechanical damage, the capacitor is preferably covered over by a structurally stable protective layer. For example, where as in FIG. 1 the annular capacitor 21 is provided at the external periphery of the cylindrical housing part 2, the capacitor 21 can be surrounded by a protective tension band, which tightly holds the capacitor in place and protects it from mechanical damage. Likewise, if the annular capacitor 21 is provided at the inner periphery of cylindrical housing part 2, as in other embodiments described herein, use can be made of a compression band radially inward of the capacitor 21, to press the capacitor 21 radially outwards into firm engagement with the inner periphery of cylindrical housing part 2 while furthermore protecting the capacitor 21 from mechanical damage.

Even if the wound-up roll capacitor is of the preferred metallized-paper type, it may be desirable, e.g., in order to counteract surface moisture and/or achieve the requisite insulation, to impregnate the roll capacitor 21 after its formation, e.g., under vacuum conditions. Alternatively, the constituent strips of the wound capacitor 21 can be dip-varnished and subsequently stoved, or the carrier for the electrodes can be impregnated, the impregnant drying out in a relatively short time after winding or rolling up the capacitor 21.

If desired, the external surface of the formed annular capacitor 21 can additionally be sealed or provided with an insulating coating or cover.

The electrical insulation as between the housing and the wound capacitor can for example be formed by lacquering the surface of the housing on which the capacitor is to be provided, this often being done anyway for purposes of attractive appearance. Frequently, such fan or blower housings are made of light-weight metal, particularly aluminum, and in that event it is advantageous to accomplish such electrical insulation by anodizing the metal of the housing. The anodized oxide coating of the housing can even exhibit an aesthetically adequate color appearance, in which case lacquering of the fan housing for aesthetic purposes may even become unnecessary. However, to proceed in that manner would be advantageous merely for reasons of economy. The anodized oxide coating of the housing can also serve as a base layer for subsequently applied lacquer. In that event, the lacquering can be performed after the annular capacitor 21 has been put into place on the fan housing, the lacquer which is then incidentally applied to the capacitor 21 in that case serving to additionally impregnate or seal the capacitor.

Figure 5:
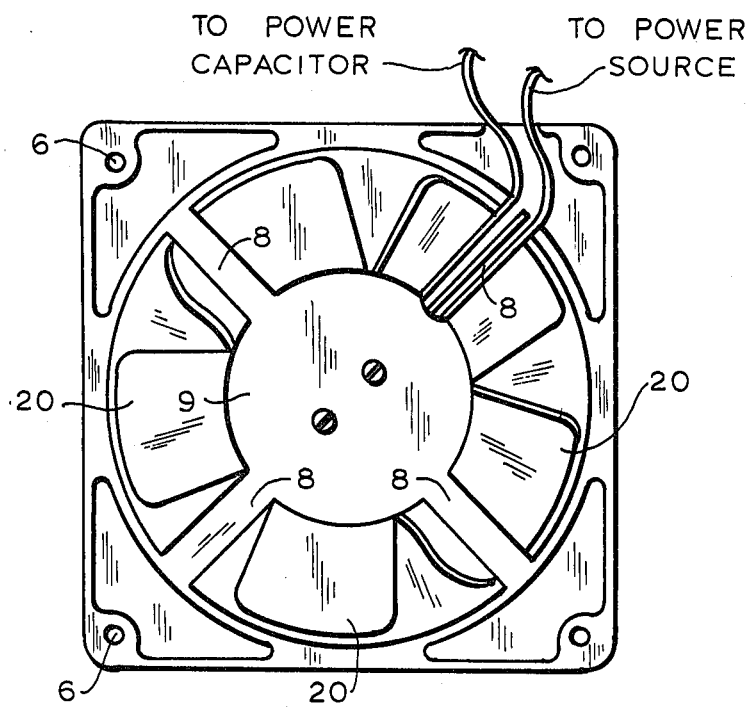
FIG. 5 depicts the fan of FIGS. 1 or 2 in end view.

The wound capacitor 21 is electrically connected to the motor winding, in particular in series with the auxiliary winding thereof, by means of electrical conductors. The power-supply conductors for the fan's drive motor are typically secured in place to extend along one of the fan's radial spokes 8. Advantageously, the conductors connecting wound capacitor 21 to the motor winding extend along the same radial spoke as the power-supply conductors in the manner depicted in FIG. 5. The power connection for the fan, e.g., the point at which the fan's power-supply cord leaves the fan housing and extends free, is advantageously provided at one of the mounting projections 3 or 4 next-over relative to the aforementioned one of the radial spokes 8.

Figure 2:
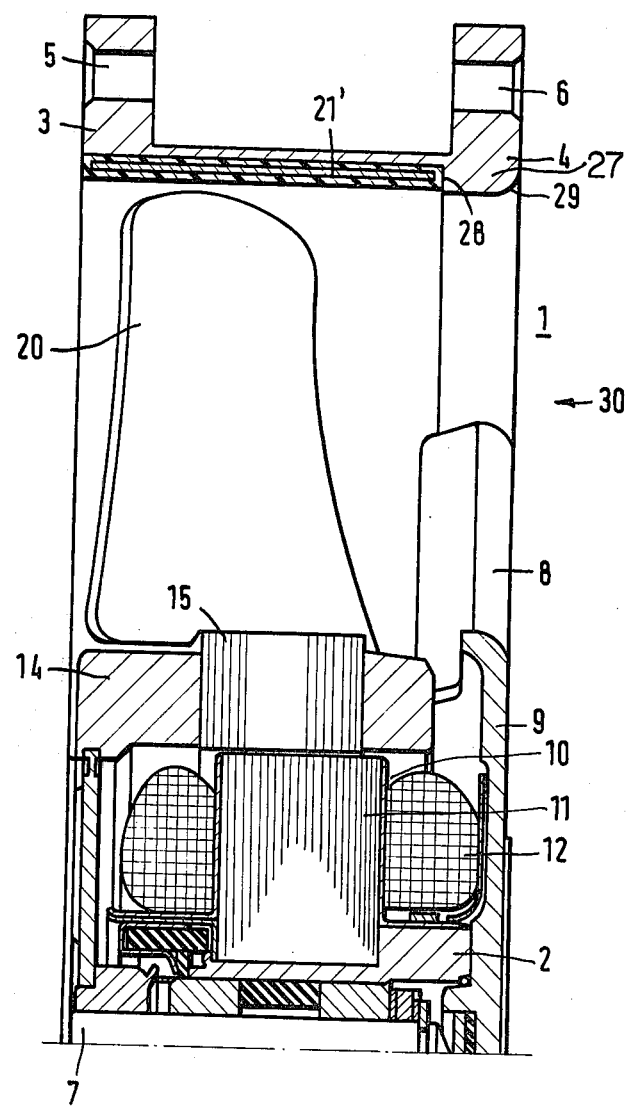
FIG. 2 is a modified version of the structure of FIG. 1, with the wound capacitor here being secured at the interior of the fan housing.

In the exemplary embodiment depicted in FIG. 2, the wound capacitor 21' is provided at the internal periphery, not the external periphery, of the cylindrical part 2 of the fan housing 1. This may be advantageous as one example, if mounting projections 3, 4 are provided at both axial ends of the fan housing 1, because in that event it becomes possible to prewind the capacitor 21' and merely insert it into place from one axial end of the fan housing 1. In FIG. 2, the internal periphery of the cylindrical housing part 2 includes an enlarged-diameter portion which accommodates the wound capacitor 21'. The right axial end of the wound capacitor 21' is held in place axially against an annular shoulder 28 provided on a radially inward annular projection 27 of the fan housing. This annular shoulder 28 is located somewhat downstream of the rounded-off annular air-inflow edge 29 of the fan housing, as considered in the direction of air flow; the direction of air flow is indicated by arrow 30. In other aspects, the embodiment of FIG. 2 is the same as that of FIG. 1, i.e., its motor being a permanent-capacitor induction motor.

Figure 3:
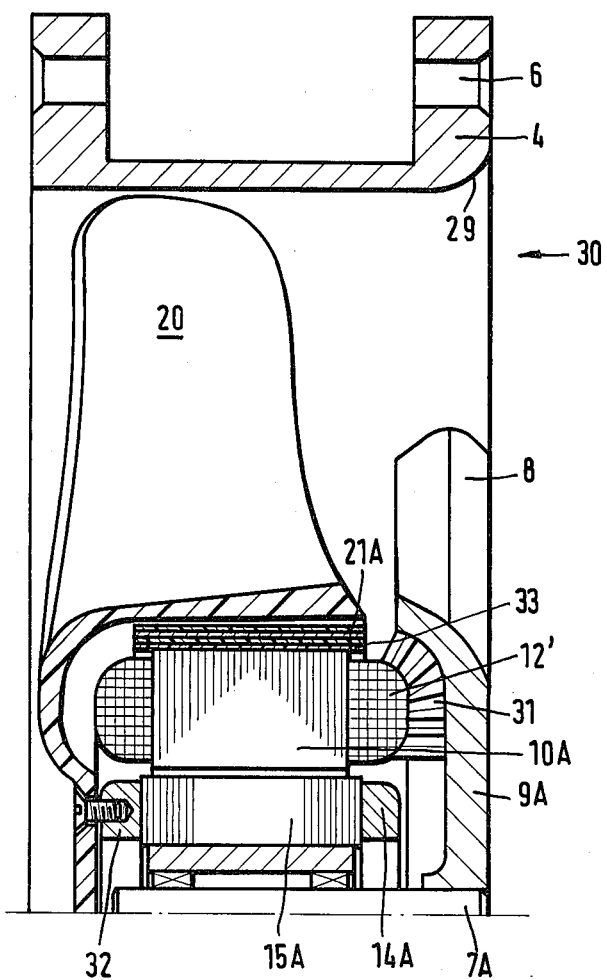
FIG. 3 is an axial section through the upper half of an axial-flow blower driven by an internal-rotor drive motor.

FIG. 3 depicts an exemplary axial-flow blower whose drive motor has an internal rotor of the short-circuited squirrel-cage type. The stator 12A is held in place on the flange 9A by means of a cast body 31 of hardened synthetic plastic resin, or the like. Cast body 31 is annular, is held as illustrated within the flange 9A, and (when viewed in cross-section as in FIG. 3) partly encircles or grips the back end of the stator winding 12', i.e., the axial end of the latter which faces towards the direction of incoming air. The rotor shaft 7A is mounted in the flange 9A non-rotatably, and the internal rotor is journalled thereon.

The internal rotor 14A rotates about this shaft 7 and comprises a stack of rotor plates 15A. A fan wheel having fan blades 20 is secured by means of screws to the short-circuiting ring 32 at the axial end of the rotor which faces away from the flange 9A. The fan wheel including its fan blades 20 is preferably produced as a one-piece injection-molded synthetic plastic item. An insulating foil or strip 33 is provided on the external periphery of the stator 10A, and the wound capacitor 21A is provided on strip 33. The more or less bell-shaped hub of the fan wheel extends axially rightwards over substantially the full axial length of the wound capacitor 21A.

Figure 4:
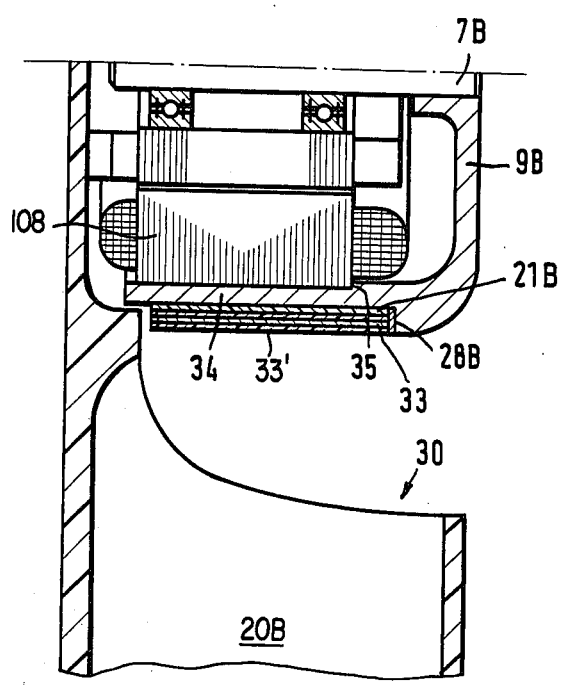
FIG. 4 is an axial section through the lower half of a radial-flow blower driven by an internal-rotor drive motor, the air-flow direction being indicated by the arrow.

FIG. 4, as indicated by arrow 30 therein, depicts a radial-flow blower, whose construction and mounting are quite similar to that of the blower shown in FIG. 3. However, in FIG. 4, the flange 9B is at its radially outward part axially elongated to form a generally cup-shaped housing 34 which accommodates and mounts the stator 10B. In particular the stack of stator plates are axially supported against an annular shoulder 35 of this cup-shaped housing 34. The wound capacitor 21B is provided on the outer periphery of the cup-shaped housing 34, with the intermediary of a strip of insulation 33' in the event housing 34 is made of metal. Mounted on the rotor is the hub of a fan wheel having fan blades 20B, the whole of the fan wheel including the blades 20B thereof being a single injection-molded item. The fan blades 20B are designed as radial vanes operative upon rotation for moving air radially along their lengths. At the air-inflow region of the cup-shaped housing 34, the latter is provided with an annular shoulder 28B which is rounded-off to facilitate air inflow and which provides a shoulder against which the wound capacitor 21B can conveniently be stopped when it is being pushed axially into place on the housing 34.

In the embodiments of FIGS. 2, 3 and 4, the capacitor is air-cooled, i.e., because it is located in the path of the transported air; this may be of advantage in extreme cases.

Figure 7:
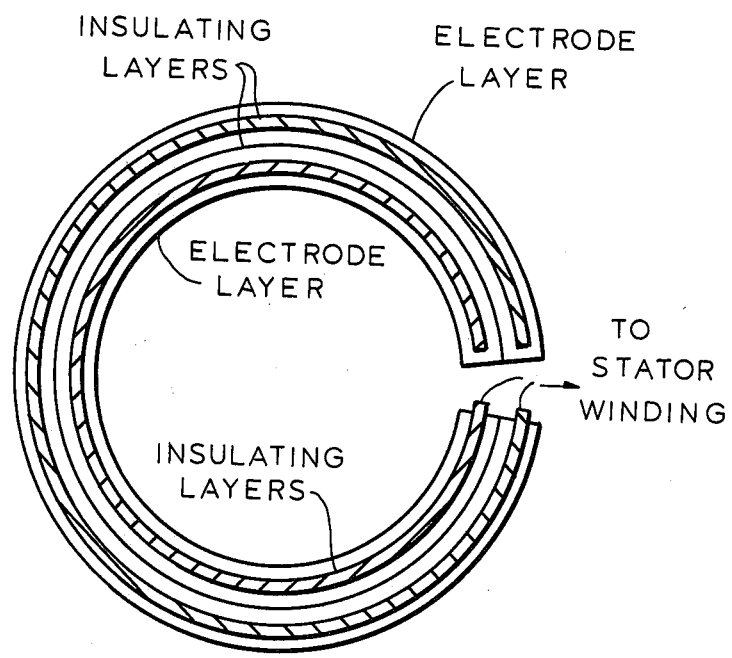
FIG. 7 is a schematic depiction of one manner of connecting a wound capacitor to the winding of the fan drive motor.

The wound capacitor used in accordance with the present invention may, in certain situations, undesirably act as an inductor. This is particularly the case, for example, when the fan's drive motor is of the external-rotor type, and the fan blades are sheet-steel members welded directly onto the outer periphery of the rotor, with the fan blades, when viewed axially, covering up the annular space between the drive motor and the surrounding housing. In that event, in accordance with a further concept of the invention, the electrode layers of the wound-up capacitor are connected to connecting conductors at only one end of the wound-up strip in the manner schematically depicted in FIG. 7, so that the winding of the capacitor be quasi-bifilar in character, and so that the presence of iron in the wound capacitor not lead to a significant or deleterious inductive behavior.

In the embodiments described above, the wound capacitor is of very large diameter, compared to ordinary non-annular capacitor rolls, especially for example when the wound capacitor is to encircle the outer periphery of the fan housing. Accordingly, the wound capacitor need include only a relatively low number of turns to achieve the requisite capacitance value. This can be quite advantageous in terms of production, particularly for example when the capacitor is wound in situ, e.g., as described with respect to FIG. 1.

If the fan housing is made of synthetic plastic material, when this is very advantageous relative to the problem of electrically insulating the wound capacitor from the fan housing. For similar reasons, it is advantageous when the fan blades, too, are of electrically insulating material.

It will be understood that each of the elements described above, or two or more together, may also find a useful application in other types of constructions differing from the types described above.

While the invention has been illustrated and described as embodied in fans and blowers of particular design, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A compact fan, comprising an induction drive motor with a stator winding; a fan wheel driven by the drive motor, the fan wheel having an external diameter; a fan housing in which the drive motor is mounted; and a phase-shifting capacitor connected to the stator winding, the capacitor including conductive strips wound up together into an annulus with an internal diameter greater than said external diameter, the annulus being generally coaxial with the drive motor, the capacitor being connecting at corresponding ends of the strips to the stator winding and thereby forming a quasibifilar network connected thereto while being otherwise insulated from the drive motor, said fan housing including a part that surrounds and is generally centered about the fan wheel, said capacitor encircling the fan wheel and being mounted on said part.

2. The fan defined by claim 1, wherein the capacitor is located in such a location that air blown by the fan wheel is blown onto the capacitor after being blown by the fan.

3. The fan defined by claim 2, wherein the fan housing has an intake end, an exhaust end, and further has a radially inwardly extending projection at the intake end.

4. The fan defined by claim 3, wherein the projection is formed into an annular shoulder against which the capacitor bears.

5. The fan defined by claim 4, wherein the shoulder has an internal diameter which is at least as large as the internal diameter of the capacitor.

6. The fan defined by claim 1, wherein the capacitor is pre-wound and is detachably securable to the fan as a discrete component.

7. The fan defined by claim 1, wherein the fan is an axial-flow blower.

8. The fan defined by claim 1, wherein the drive motor has an axial length which is surrounded by the fan housing.

9. The fan defined by claim 1, wherein the annulus is of a generally circular configuration.

10. The fan defined by claim 1, wherein the fan housing has radially extending mounting spokes upon which the drive motor is mounted, and wherein the fan further includes power-supply conductors mounted upon one of the mounting spokes, and wherein the fan still further includes connecting conductors located adjacent the power-supply conductors and connecting the capacitor to the stator winding.

11. The fan defined by claim 1, wherein the drive motor is a squirrel-cage motor.

12. A compact fan comprising, a fan housing; an induction drive motor mounted in the fan housing; a fan wheel driven by the drive motor, the fan housing surrounding the fan wheel, the drive motor including a stator winding and the fan including a phase-shifting capacitor electrically connected to the stator winding for generation of an auxiliary phase of energization, the capacitor being a wound capacitor of annular overall configuration surrounding and generally coaxial with the drive motor and having an internal diameter greater than the external diameter of the fan wheel, the wound capacitor comprising a pair of wound-up electrode strips each electrically connected to the stator winding, the electrical connection to the stator winding being at the same end of both electrode strips as considered in the direction of winding of the strips to thereby obtain a quasibifilar electrical configuration of the wound capacitor.

* * * * *